E. W. BONFIELD & J. E. FELLOWS.
MACHINE FOR MAKING CARDBOARD BLANKS.
APPLICATION FILED DEC. 16, 1909.
1,011,906.
Patented Dec. 19, 1911.
6 SHEETS—SHEET 1.
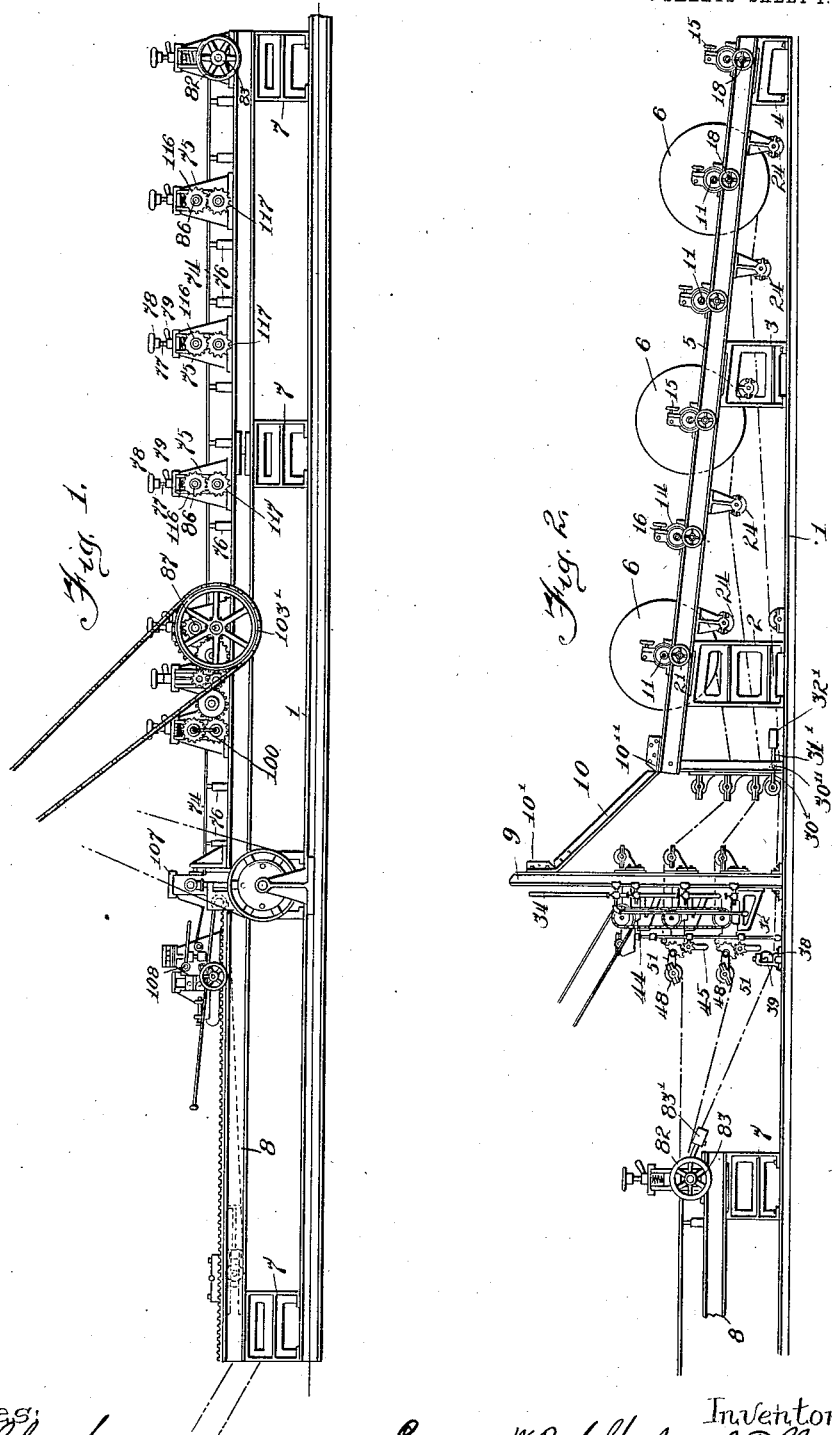

E. W. BONFIELD & J. E. FELLOWS.
MACHINE FOR MAKING CARDBOARD BLANKS.
APPLICATION FILED DEC. 16, 1909.
1,011,906.
Patented Dec. 19, 1911.
6 SHEETS—SHEET 2.
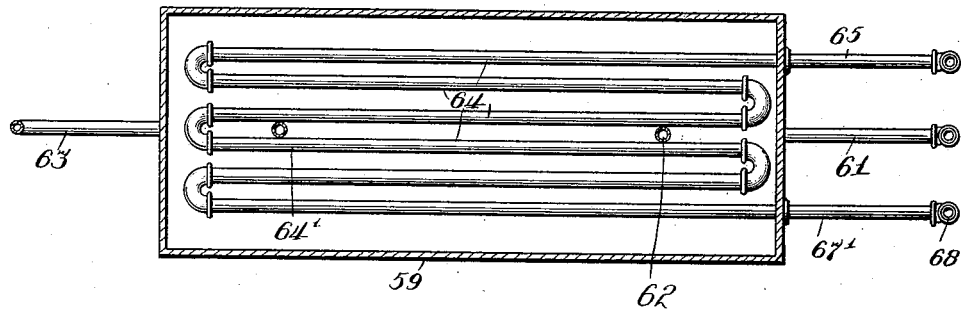
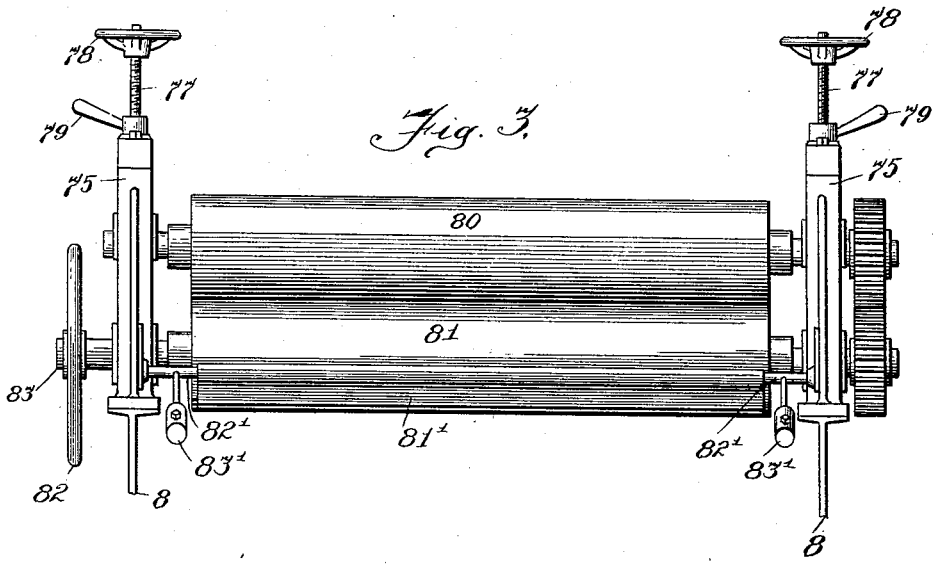

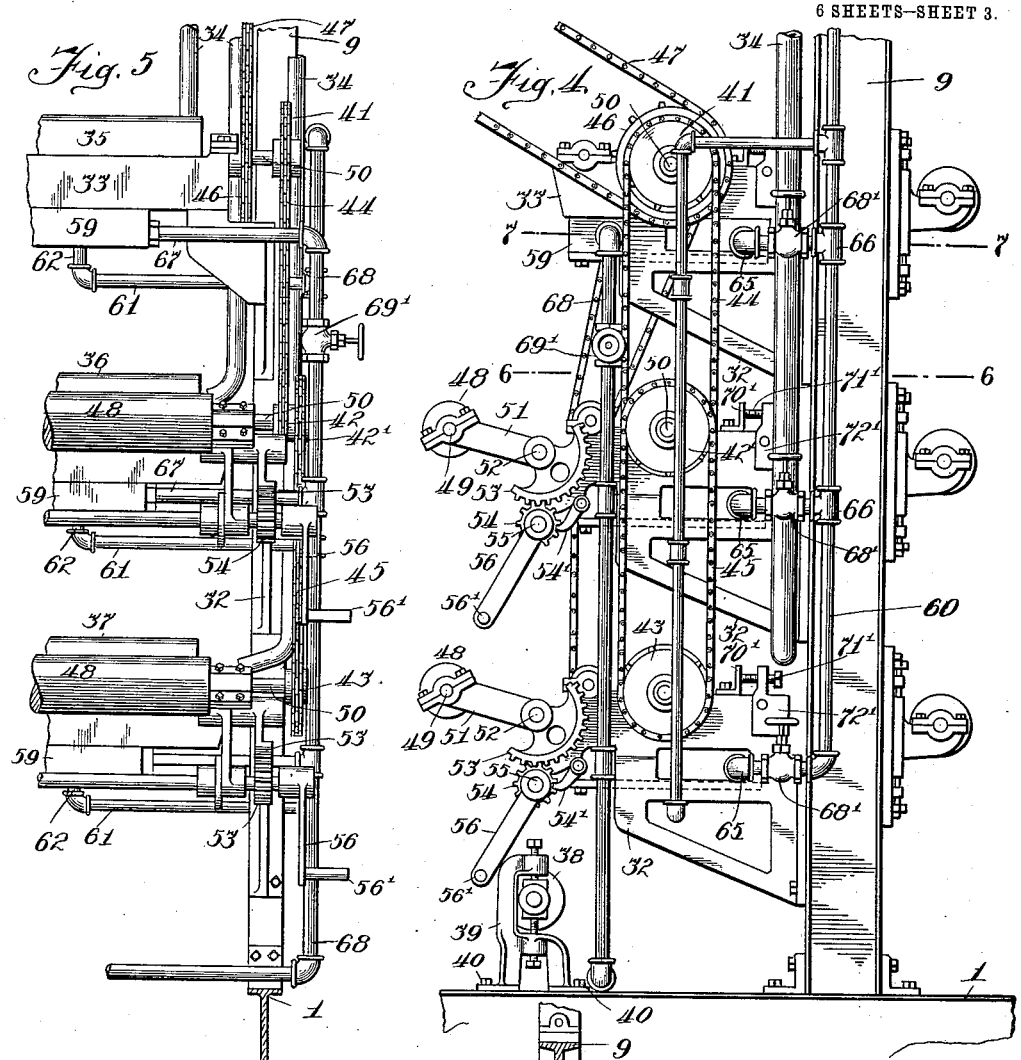
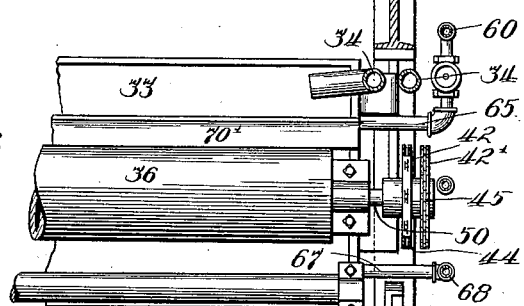

E. W. BONFIELD & J. E. FELLOWS.
MACHINE FOR MAKING CARDBOARD BLANKS.
APPLICATION FILED DEC. 16, 1909.
1,011,906.
Patented Dec. 19, 1911.
6 SHEETS—SHEET 4.
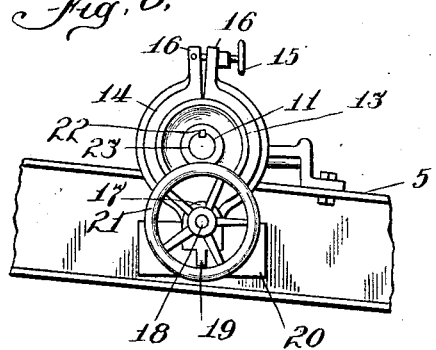
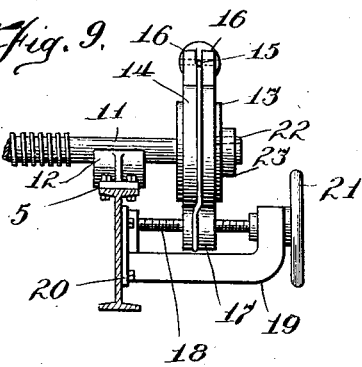
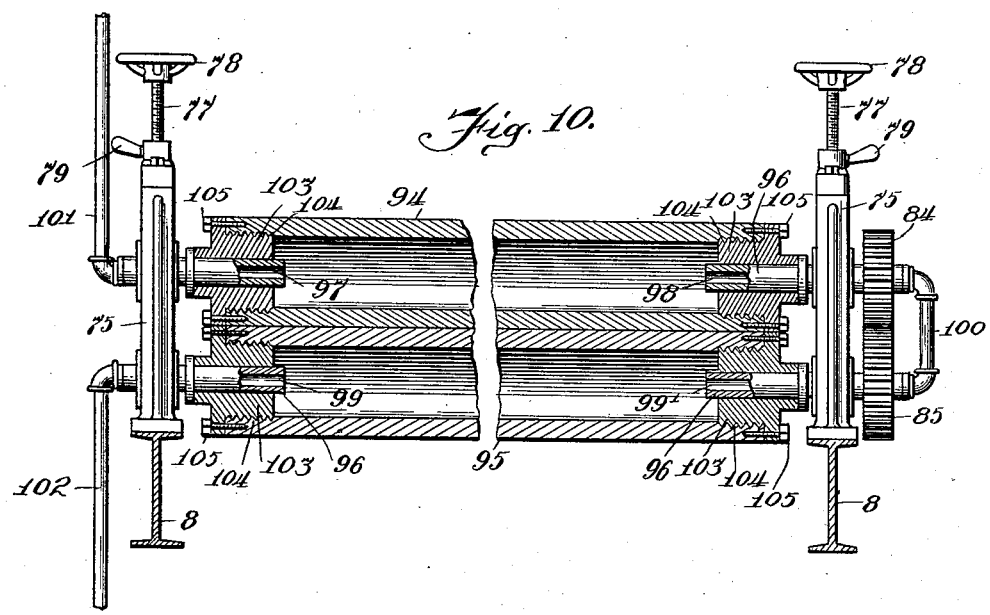

E. W. BONFIELD & J. E. FELLOWS.
MACHINE FOR MAKING CARDBOARD BLANKS.
APPLICATION FILED DEC. 16, 1909.
1,011,906.
Patented Dec. 19, 1911.
6 SHEETS—SHEET 5.
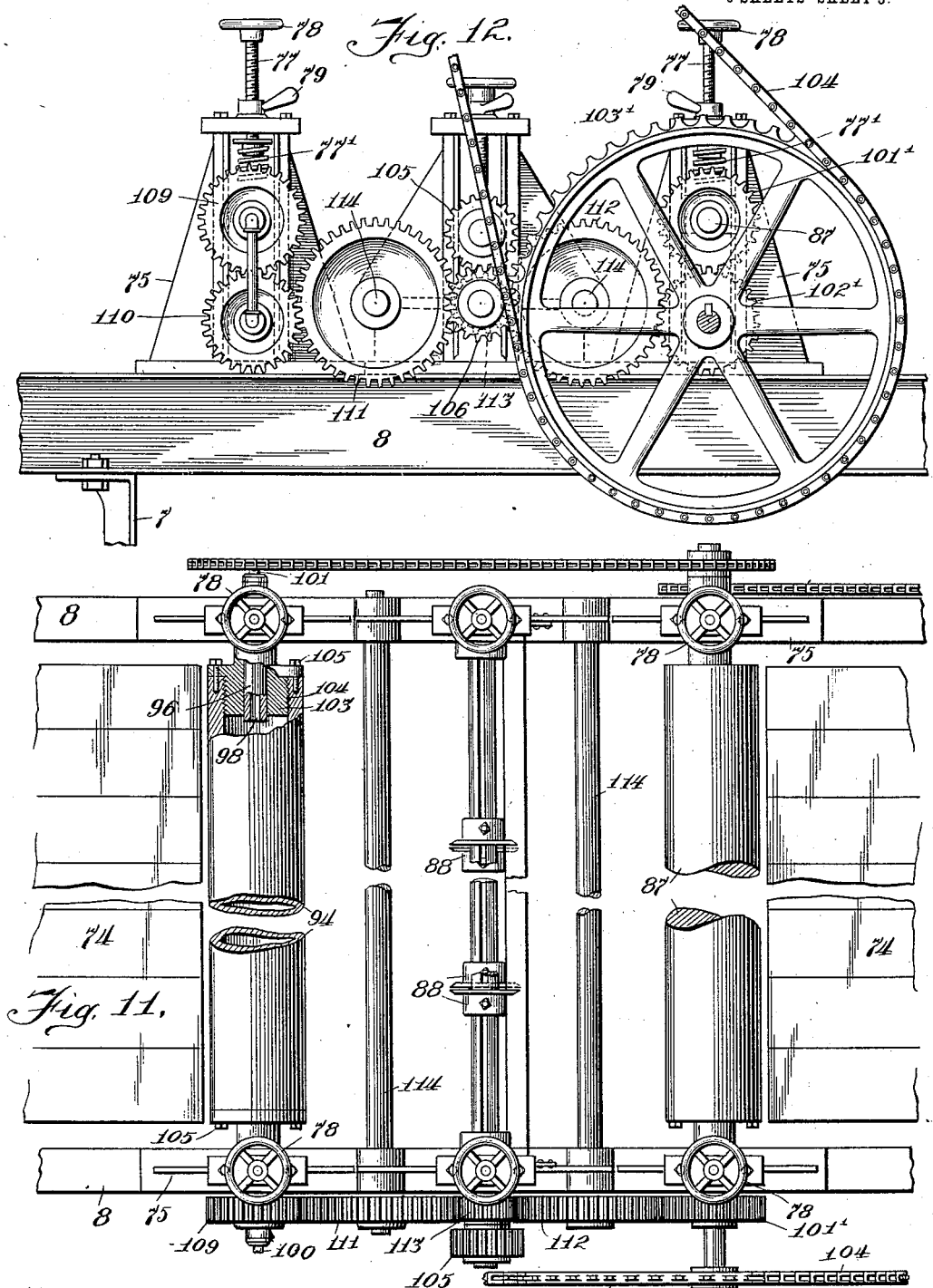

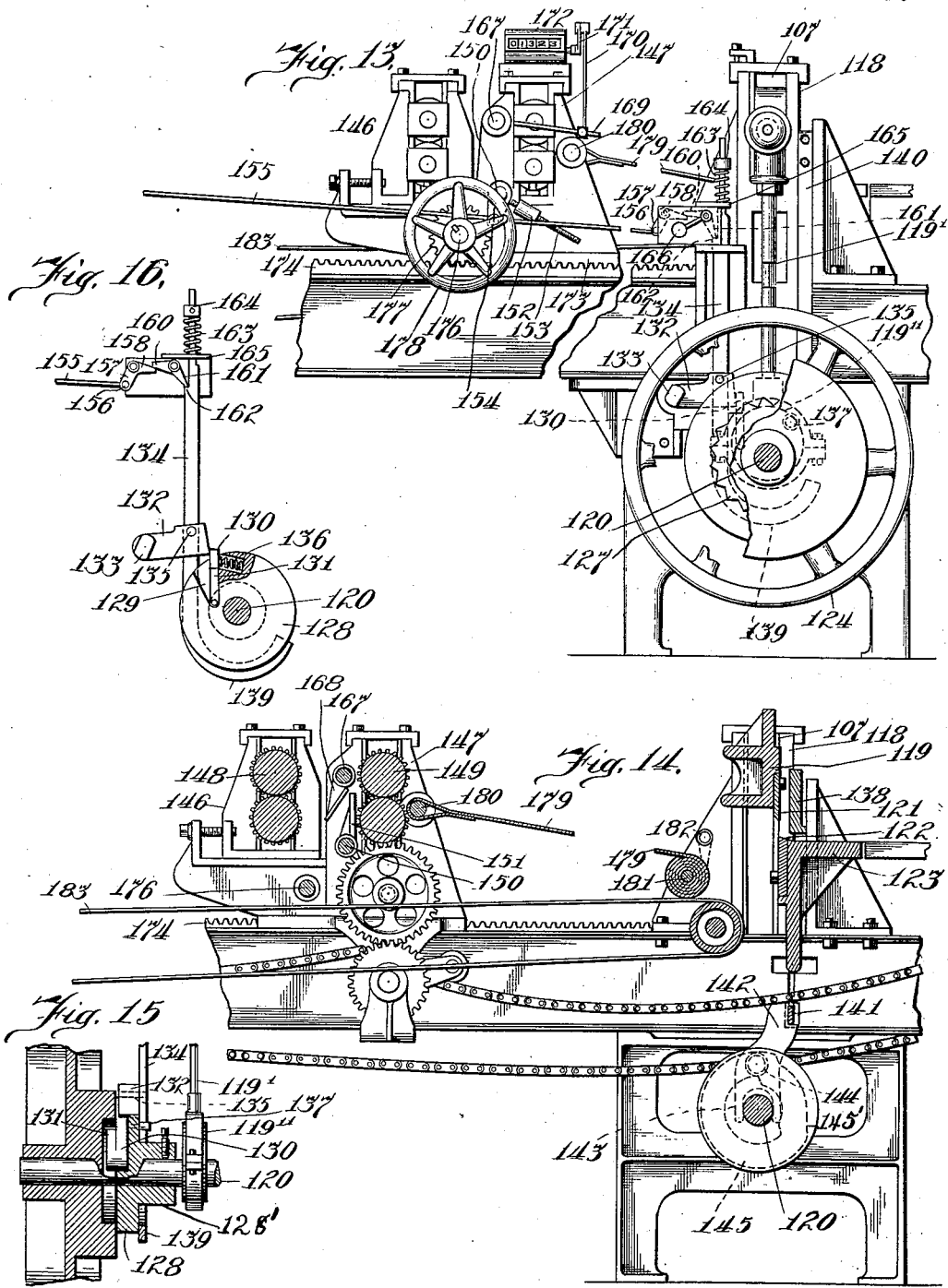

UNITED STATES PATENT OFFICE.

EMMONS W. BONFIELD, OF CHICAGO, AND JAMES E. FELLOWS, OF EVANSTON, ILLINOIS.

MACHINE FOR MAKING CARDBOARD BLANKS.

1,011,906.

Specification of Letters Patent.

Patented Dec. 19, 1911.

Original application filed July 31, 1909, Serial No. 510,517. Divided and this application filed December 16, 1909. Serial No. 533,365.

*To all whom it may concern:*

Be it known that we, EMMONS W. BONFIELD and JAMES E. FELLOWS, citizens of the United States, residing, respectively, in the cities of Chicago and Evanston, in the county of Cook and State of Illinois, have invented certain new and useful Improvements in Machines for Making Cardboard Blanks, of which the following is a specification.

This application is a division of an original application filed by us July 31, 1909, Serial No. 510517.

The invention relates to improvements in machines for making cardboard blanks and refers more particularly to a machine for assembling and gluing together a plurality of webs of cardboard which are then severed into blanks of the desired length.

Among the salient objects of the invention are to provide in a machine of the character referred to an improved construction for superposing, pasting and gluing together a plurality of webs which are then delivered to the automatic slitting and shearing mechanism; to provide a construction in which the above operations may be carried on continuously, and substantially without any manual control; to provide a construction in which the various operating parts are readily adjustable to compensate for wear or any lack of accuracy in manufacturing or assembling; to provide a construction in which the supply rolls are so arranged that stock varying in character, as in texture, color, etc., may be fed from the same machine without necessitating the removal of the stock not in use; to provide improved means for mounting the supply rolls in order to permit longitudinal adjustment of the same; to provide an improved mechanism for applying paste or glue to the webs as they are drawn from the supply rolls, and in which the fountains containing the paste may be kept constantly heated; to provide a construction of the character last referred to in which the respective fountains containing the paste may all be kept at a predetermined, uniform, temperature or in which the temperature may be varied for the respective fountains if desired; to provide a construction in which the upper pressure rolls may be bodily adjusted to and from the lower rolls and held yieldably in engagement with the latter; to provide a construction in which the feed rolls are heated by steam or otherwise, in order to more effectively glue the webs of stock together; to provide means for automatically cleaning the lower rolls of each set, and in general to provide an improved construction of the character referred to.

The invention consists in the matters hereinafter described and more particularly pointed out in the appended claims.

In the drawings—Figures 1 and 2 taken together represent a side elevation of the machine; Fig. 3 is a rear end elevation of the gathering rolls and showing the scraper mechanism; Fig. 4 is a side elevation of the paste applying mechanism; Fig. 5 is a fragmentary front end elevation of the same; Fig. 6 is a fragmentary horizontal sectional view taken on lines 6—6 of Fig. 4 and looking downwardly; Fig. 7 is a horizontal sectional view taken approximately on lines 7—7 of Fig. 4 and showing more particularly the arrangement of the steam pipes by which the fountains are heated; Fig. 8 is a detail view showing the manner of mounting the supply rolls; Fig. 9 is another detail view showing the manner of supporting the supply rolls; Fig. 10 is a vertical sectional view, with parts broken away, of the forward pair of feed rolls, and showing the manner of heating the same; Fig. 11 is a top plan view partly in section, with parts broken away to reduce the size of the drawing; Fig. 12 is a side elevation of a portion of the machine shown in Fig. 1 and showing the manner of varying the pressure between the rolls; Fig. 13 is a fragmentary side elevation of the shearing mechanism and tripping devices, parts, however, being broken away and shown in section; Fig. 14 is a similar sectional view of that part of the machine shown in Fig. 13; Fig. 15 is a detail sectional view of the clutch mechanism; Fig. 16 is a detail view showing the manner of throwing the clutch into and out of operative position.

Referring to the drawings, 1 designates a base support for the machine, upon the front end of which is mounted a plurality of standards designated, 2, 3 and 4 respectively, arranged in transversely opposite pairs and carrying at their upper end an inclined frame 5 upon which are mounted the supply rolls 6. As shown in Fig. 2 the frame 5 is inclined upwardly toward its rear end in order to more readily draw the webs of stock from the rolls. The front end of the machine is similarly provided with transversely extending standards 7, 7, upon the upper ends of which are mounted a longitudinally extending bed frame 8. Between the frames 5 and 8 are mounted upright standards 9 carrying paste applying mechanisms hereinafter more particularly described. Preferably, the standards 9 are provided with brace supports 10 secured at one end as shown at 10′ to the standards and at their other end as shown at 10″ to the frame 5.

Describing now more particularly the supply rolls, each is mounted upon a suitable shunt or roller 11 seated in semicircular bearings 12 carried by the opposite sides of the frame 5. The rollers are adjustable endwise in order to bring the various rolls into exact alinement with each other. To this end, the shaft 11 is provided at one end with a channeled collar 13, in which is seated a divided bearing ring 14, the two parts of which are locked together by a hand screw 15 extending through opposite ears 16. The lower end of the locking ring 14 is provided with an eye 17 through which extends an adjusting screw 18. The latter is mounted in a right angled bracket 19 secured as shown at 20 to the frame 5 and provided with a hand wheel 21 in order that it may be more readily operated. The channeled collar 13 is keyed to the shaft 11 by means of a key pin 22 extending through an enlargement 23 upon the outer end of the shaft 11.

In the drawings, only three supply rolls 6 are shown, but it is apparent that as many rolls may be mounted upon the frame 5 as are desired. In order to guide the webs as they are drawn from the supply rolls, we provide a plurality of confining rollers 24 extending transversely of the machine and journaled at either side in a forked arm 30′. The latter is in turn pivotally mounted on the main frame as shown at 30″ and is provided at its forward end with an extension 31′ carrying a counter-weight 32′. The arrangement is such that the tension of the roller upon the web can be adjusted by shifting the counter-weights 32′ along the respective extensions 31′.

From the foregoing arrangement it will be seen that any number of supply rolls may be used and a blank of any desired number of ply formed without necessitating any substantial change in the arrangement of the supply rolls.

Describing now the manner of applying the paste to the webs, which forms an important feature of the present invention, the standards 9 are each provided with a plurality of forwardly extending brackets 32. Between each pair of brackets is supported a paste trough or fountain 33, to each of which paste or glue is fed through suitable pipes 34, 34 leading from any suitable source of supply. In the upper edge of each trough is journaled a fountain roll as 35, 36 and 37 respectively, the lower side of which dips into the supply of glue or paste, and the upper side of which serves as a support over which the web of cardboard is drawn.

Inasmuch as it is only necessary to apply paste or adhesive to one of each of the meeting surfaces of the several webs, no paste applying mechanism is provided for the lowermost web. This latter is drawn across a guide roll 38 journaled in a bracket casting 39 mounted upon the base support as shown at 40. The fountain rolls are each provided with journal extensions 50 on which are mounted sprockets 41, 42, 42′ and 43. These sprockets are intergeared by means of sprocket chains 44, 45, and the uppermost spindle 50 is provided with a sprocket 46 driven by a sprocket chain 47 leading to a counter-shaft (not shown).

In order to tighten the webs of cardboard before they pass to the gathering rolls hereinafter described, we provide a plurality of stretcher rolls 48. Each of these rolls is journaled between a pair of arms 51 as shown at 49. The rear end of each of these arms is pivotally mounted as shown at 52 and carries a segmental gear 53. Each of these segments 53 is actuated by a ratchet 54 pivotally mounted at 55 to an extension of the bracket 32. Each ratchet 54 is provided with a lever arm 56 and handle 56′ and is locked in adjusted position by means of a pawl 54′ as shown.

As part of the present invention, means are provided whereby each fountain is provided with a steam chest or heating chamber 59. This steam chest extends transversely of the machine and directly beneath the corresponding fountain as shown more clearly in Fig. 5. Each heating chamber is supplied with steam from the main pipe 60 and branch pipe 61 delivering into the chamber as shown at 62.

In order to further supply heat to the chambers and more effectively regulate the temperature therein, each is provided with a closed steam coil 64. One end of each coil leads to a branch inlet pipe 65 connected to the main supply pipe by a T-union 66. The opposite end of the coil is connected to a branch exhaust pipe 67 leading to a common exhaust 68. The supply of steam to the chambers and steam coils may be regulated by any suitable valve mechanisms as 68′, 69 respectively. In case a blank of only three ply is desired, the upper roll is not used and accordingly the steam is cut off from its steam chamber 59. The exhaust pipe may also be cut off from this chamber by means of a valve 69′. In order to apply the paste uniformly to the rolls, the latter are provided with any suitable scraper mechanism 70′ mounted in brackets 72' and adjustable to and from the rolls by means of set screws 71'.

Referring now to the front end of the machine, upon suitable standards 76 is mounted a table 74 which extends across the frame and supports the blanks as they are fed from the machine. At either side of this table upon the frame 8 is mounted a series of brackets 75 arranged in pairs and between each pair is journaled two superposed coöperating rolls. The lower rolls project through the face of the table, and the latter is, of course, suitably apertured for this purpose. In the present invention, each pair of rolls is held yieldably in engagement with each other by means of coiled expansion springs 77' seated in the upper ends of the brackets 75 and bearing against the upper member of each pair of rolls. The tension upon the spring may be regulated by means of a screw 77 and hand wheel 78, and locked in position by means of a screw pin 79. In order to regulate the pressure, each pair of rolls may be provided with a simple indicator mechanism. The webs of stock after they leave the gluing mechanism are carried to gathering rolls 80, 80'. These rolls are manually controlled by means of a hand wheel 82 mounted upon an extension 83 of the shaft of the lower roll. The upper roll is driven by means of the gear 84 which meshes with a gear 85 carried by a journal extension of the lower roll. From the gathering rolls, the webs of stock pass to the presser rolls 86, of which there are three sets in the present instance. From the latter, the multiply web passes into the forward pair of feeding rolls 87 and thence to the slitting rolls 88 suitably mounted in the main frame. The latter, however, form no part of the present invention, being covered in the companion application heretofore referred to, of which this is a division. Accordingly, they need not be more particularly described. It is to be noted, however, that the gathering rolls 80, 81 are provided with a scraper mechanism 81' pivoted on journals 82' and provided with counter-weights 83'. The purpose of this device is to scrape the surplus paste from the rolls and thus keep the latter clean.

At the front of the slitting rolls are mounted a second pair of feed rolls 94 and 95. These rolls, are, however, kept heated in order to more effectively glue the webs together. To this end, in each end of these rolls 94 and 95 is seated a plug or closure member 103 screw threaded into the roll as shown at 104 and locked in position by means of screw bolts 105. Each of these plugs is apertured to receive a stub shaft 96 journaled in the respective supporting brackets 75. The upper shafts 96 are centrally bored as shown at 97, 98 and the lower shafts are similarly bored as shown at 99, 99' respectively. To the bore 97 is connected a steam inlet pipe 101, and with the bore 99 is connected an exhaust pipe 102. The steam passes from one roll to the other by means of a union member 100. From the front feed rolls, the web passes to the shearing mechanism. This latter, however, forms no part of the present invention, inasmuch as it is covered in the companion application heretofore referred to, of which this is a division.

The construction of the shearing mechanism may be described as follows: At either side of the frame is mounted a standard 118 provided with vertically extending ways 107 between which is arranged to slide a shear bar 119. With each end of the shear bar is mounted an eccentric rod 119' which extends downwardly to and connects with an eccentric 119" mounted upon the cross shaft 120 journaled in the main frame. This shear bar 119 is provided with a shear blade 121, the lower cutting edge of which coöperates with a fixed shear blade 122 mounted upon a cross supporting bracket 123, and having its upper edge approximately flush with the table. The eccentric shaft 120 is actuated in the following manner: Upon one end of this shaft is loosely mounted a belt pulley 124 which is continuously driven by a belt 125. Within the hub of this pulley is mounted an internal gear or ratchet 127 and adjacent the hub is keyed upon the shaft a clutch member 128, which has mounted in a recess 129 in its face, a dogging pawl 130. The pawl is provided with an off-set portion 131 which extends within the internal ratchet 127 and acts as a pawl to engage the latter. The main body of the pawl extends outwardly beyond the periphery of the clutch wheel and normally engages the lower end of a detent 132, which is pivoted as indicated at 133, upon a fixed part of the frame structure, and is adapted to be lifted by shipping rod 134 carrying a stud 135 which engages the detent. When the pawl is thus engaged with the detent and forced back against the front wall of the recess in which it is pivoted, it is held out of engagement with the teeth of the ratchet 127 by means of a coiled expansion spring 136 arranged to act thereon. Inasmuch as the pulley 124 is constantly rotating, this eccentric shaft is thus brought into operation to draw down the shear blade.

In order to arrest the eccentric shaft automatically at the end of each rotation, a stud or projection 137 is provided upon the clutch member in position to engage the lower curved end of the shipping rod cam fashion. The arrangement of the parts just described is such that in the forward rotation of the clutch member the shipping rod is depressed and restored to its normal position after which the stud passes out of engagement with the rod, a latch member now to be described serving to retain the shipping rod in its normal position. The shipping rod having been depressed the detent 132 engages the pawl 130 as it comes around and forces it backwardly and out of engagement with the ratchet, thus automatically arresting the shaft. In this connection it will be noted that the lower end of the shipping rod is provided with a curved extension 139 which is engaged by the stud 137 which forces down the shipping-rod.

In order to more accurately cut the material means is provided for clamping the web of material and holding it immovable while the shears are cutting. To this end the clamping bar 138 is mounted to reciprocate in suitable guide ways just above the bed plate and is adapted to coöperate with the fixed bar 123 heretofore described. At each end of the clamping bar 138 is connected a strap link 140 extending down the outer side of the frame. The lower ends of these links 140 are connected by a cross rod 141 carrying at either side a cam lever 142 having a forked extension 143 which engages the shaft 120. The arrangement is such that the clamp 140 will descend and grip the web just in advance of the shear blade and hold it clamped during the full stroke of the latter. The clamping bar is positively returned to normal by means of the cam rollers 144.

Describing now the tripping mechanism which sets in motion the shear actuating mechanism, in suitable standards 147 are mounted snatch rollers 149. In one standard 147 is journaled a transversely extending shaft 150, one end of which is provided with a tripping finger 151 which is normally held in upright position by means of a counterweight 152 adjustably mounted upon the rod 153 fixed to the shaft 150. A trip rod 155 is operatively connected to the shaft 150 by means of a link or lug 154. The trip rod extends forwardly to a point adjacent the shipping rod and there is connected as shown at 156 to one arm of a bell crank lever 157 pivoted to the main frame as shown at 157. The other arm of this lever 157 operatively engages one arm of a V-shaped detent 160. The lower arm 161 of the detent engages a notch 162 in the shipping rod, and holds the latter depressed against the tension of a coiled expansion spring 163 interposed between the collar 164 fixed to the upper end of the shipping rod and a suitable bracket 165. The arm 161 of the detent is held in engagement with a notch 162 by means of a counterweight 166. The arrangement just described is such that when the tripping rod is shifted forwardly toward the shipping rod, the trip first forces the detent out of engagement with the shipping rod permitting the latter to rise and thereafter slips past the end of the detent so that the latter may be thrown back into engagement with the notch of the shipping rod as soon as the latter is again depressed and before the tripping rod returns to its normal position. This is insured by reason of the fact that the advancing blank will hold the finger 151 depressed until it has passed beyond the snatch rolls 149. In the rear of the rolls 149 are mounted delivery rolls 148 mounted in similar standards 146. Above the shaft 150 is mounted a similar shaft 167 carrying a normally downwardly extending finger 168 at the rear of the snatch rolls 149. One end of this shaft 167 is provided with a lever arm 169 to which is connected the lower arm 170 of a bell crank 171. The latter is in turn connected to any suitable tallying mechanism 172 mounted upon the upper end of the adjacent standard. The connection is such that the tallying mechanism will register once every time the finger 168 is actuated by the advancing blank.

In order to cut the cardboard into blanks of any desired length, the standards 146 and 147 are mounted upon suitable bed plates 173. These latter are adjustably mounted upon rack bars 174 secured to the front end of the main frame. Between the standards 146 and 147 is mounted a shaft 176, each end of which is provided with a gear 177 which gears mesh with corresponding rack bars and are manually controlled by means of hand wheels 178. After the blanks pass through the snatch rolls they fall upon the traveling carrier 183 which leads to the delivery end of the machine. In order to convey the blanks from the shearing mechanism to the snatch rolls, we provide an apron 179, one end of which is connected to roller 180 mounted between the standards 147, and the other end is wound around a similar roller 181 secured to the main frame. The roller 181 is locked against rotation by means of manually controlled pawls 182. The apron may be lengthened or shortened by simply releasing the pawls and unwinding or winding up the apron in an obvious manner.

The forward pair of feed rolls 87 are geared together by means of gears 101, 102, and positively driven from a main sprocket 103, having a sprocket belt 104 leading to the main driving shaft (not shown). The slitting rolls are also provided with intermeshing gears 105, 106, and the front pair of feed rolls with somewhat similar gears 109, 110. These gears are operatively connected to the main sprocket wheel by means of relatively large spur gears 111, 112 respectively and an intermediate gear 113. The gears 111 and 112 are mounted upon cross shafts 114 extending transversely of the main frame. The respective pair of tracer rolls 86 are provided with intermeshing sprockets 116, 117 respectively and may be operatively connected to the main sprocket 103 by means of a suitable belt or chain (not shown) which extends on the opposite side of the machine from that of the wheel 103. The operation of the device is apparent from the foregoing description and need not be described in detail. It is to be noted, however, that the various parts of the mechanism for applying the paste and for building up and uniting the webs of stock may be readily adjusted and regulated.

While we have herein shown one embodiment of our invention, it is not limited to the details of construction shown, except as set forth in the appended claims.

We claim as our invention:

1. In a machine for making card-board blanks, the combination with means for supporting a plurality of rolls of paper stock, means for drawing off the web from each roll, means for applying adhesive to the webs, adjustably mounted tension rollers for maintaining the tension upon the webs, means for locking said rollers in adjusted position, means for pressing the webs together after adhesive is applied, an automatic shear mechanism, and means for intermittently actuating said shear mechanism.

2. In a machine of the character described, the combination with means for supporting a plurality of rolls of paper stock, of means for drawing off the web from each roll, a plurality of adhesive applying rollers, fountains associated with said rollers, a heating chamber associated with each fountain, means for applying regulated quantities of heat to said chambers, means for pressing the webs together after the adhesive is applied, and means for severing the built up webs into blanks of predetermined size.

3. In a machine of the character described, the combination with means for supporting a plurality of rolls of paper stock, of means for drawing off the web from each roll, means for applying adhesive to the webs, means for pressing the webs together after adhesive is applied, automatic shear mechanism through which the built up web is arranged to travel, actuating mechanism for operating said shear mechanism, and a tripping member interposed in the path of the advancing web and controlling said actuating mechanism.

4. The combination with a main frame, of means for feeding a plurality of webs of stock over said frame, means for applying adhesive to said webs, presser rolls through which the webs travel after the adhesive is applied, scraper mechanism associated with said presser rolls, and means for automatically severing the built up web into blanks of predetermined lengths.

5. In a machine of the character described, the combination with means for supporting a plurality of rolls of paper stock, of means for drawing off the web from each roll, paste applying members, fountains in which said paste applying members are seated, a heating chamber associated with each fountain, a closed heating coil associated with each of said chambers and means for supplying heat to said chambers and coils.

6. In a machine of the character described, the combination with a main frame, of means for feeding a plurality of webs of stock over said frame, means for applying adhesive to said webs, tension rollers for maintaining the tension upon the webs, a swinging arm in which each of said rollers are mounted, of means for locking said rollers in any adjusted position, means for pressing the webs together after the adhesive is applied, and automatic shear mechanism for severing said webs.

EMMONS W. BONFIELD.
JAMES E. FELLOWS.

Witnesses:
ALBERT H. GRAVES,
EMILIE ROSE.